US012134460B2

(12) United States Patent
Joudon et al.

(10) Patent No.: US 12,134,460 B2
(45) Date of Patent: Nov. 5, 2024

(54) BLADE COMPRISING A COMPOSITE MATERIAL STRUCTURE AND ASSOCIATED MANUFACTURING METHOD

(71) Applicant: Safran Aircraft Engines, Paris (FR)

(72) Inventors: Vincent Joudon, Moissy-Cramayel (FR); Vivien Mickaël Courtier, Moissy-Cramayel (FR); Clément Pierre Postec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/793,877

(22) PCT Filed: Jan. 19, 2021

(86) PCT No.: PCT/FR2021/050090
§ 371 (c)(1),
(2) Date: Jul. 19, 2022

(87) PCT Pub. No.: WO2021/148750
PCT Pub. Date: Jul. 29, 2021

(65) Prior Publication Data
US 2023/0044779 A1 Feb. 9, 2023

(30) Foreign Application Priority Data
Jan. 20, 2020 (FR) ....................................... 2000527

(51) Int. Cl.
*B64C 11/26* (2006.01)
*B29C 70/24* (2006.01)
(Continued)

(52) U.S. Cl.
CPC .............. *B64C 11/26* (2013.01); *B29C 70/24* (2013.01); *B29C 70/345* (2013.01); *F01D 5/282* (2013.01);
(Continued)

(58) Field of Classification Search
CPC ......... B64C 11/04; B64C 11/06; B64C 11/26; B26C 70/20; B26C 70/24; B26C 70/345;
(Continued)

(56) References Cited

U.S. PATENT DOCUMENTS

| 11,131,197 B2 | 9/2021 | Courtier et al. |
| 2007/0007386 A1 | 1/2007 | Coupte et al. |

(Continued)

FOREIGN PATENT DOCUMENTS

| FR | 3 080 322 A1 | 10/2019 |
| WO | WO2006/136755 A2 | 12/2006 |

OTHER PUBLICATIONS

French Search Report for French Application No. 2000527, dated Nov. 2, 2020.
(Continued)

*Primary Examiner* — Elton K Wong
(74) *Attorney, Agent, or Firm* — BIRCH, STEWART, KOLASCH & BIRCH, LLP

(57) ABSTRACT

The present invention relates to a blade (7) comprising: —a composite material structure (17), —a blade root fastening portion (9) further comprising a shoulder (10) extending into the recess from the wall —a base (18) arranged in the recess and comprising a support member configured to abut against the shoulder (10) of the blade root fastening portion (9) and a passage (39) formed in the support member, the sections (23) of the blade root portion (22) of the composite material structure extending through the passage (39), and —a blocking part (19) arranged in the recess between the two sections (23) of the blade root portion (22) such that each section of the blade root portion (23) is pressed against the support member by the blocking part (19).

10 Claims, 8 Drawing Sheets

(51) Int. Cl.
  *B29C 70/34* (2006.01)
  *B29L 31/08* (2006.01)
  *F01D 5/28* (2006.01)
(52) U.S. Cl.
  CPC ... *B29L 2031/082* (2013.01); *F05D 2220/323* (2013.01); *F05D 2260/36* (2013.01); *F05D 2300/6034* (2013.01); *F05D 2300/612* (2013.01)
(58) Field of Classification Search
  CPC ...... F01D 5/282; F01D 5/3023; F01D 5/3053; F01D 5/32; F01D 5/34; B29L 2031/082; F05D 2300/6034; F05D 2300/612; F05D 2260/36; F05D 2220/323
  See application file for complete search history.

(56) References Cited

U.S. PATENT DOCUMENTS

| | | | | |
|---|---|---|---|---|
| 2015/0110630 A1* | 4/2015 | Nagle | ............... | B64C 11/26 416/204 R |
| 2015/0330233 A1* | 11/2015 | Petellaz | ............... | F01D 5/10 29/889.7 |
| 2019/0301290 A1* | 10/2019 | Kamiya | ............ | B29C 70/202 |

OTHER PUBLICATIONS

International Search Report for International Application No. PCT/FR2021/050090, dated Jun. 8, 2021.

* cited by examiner

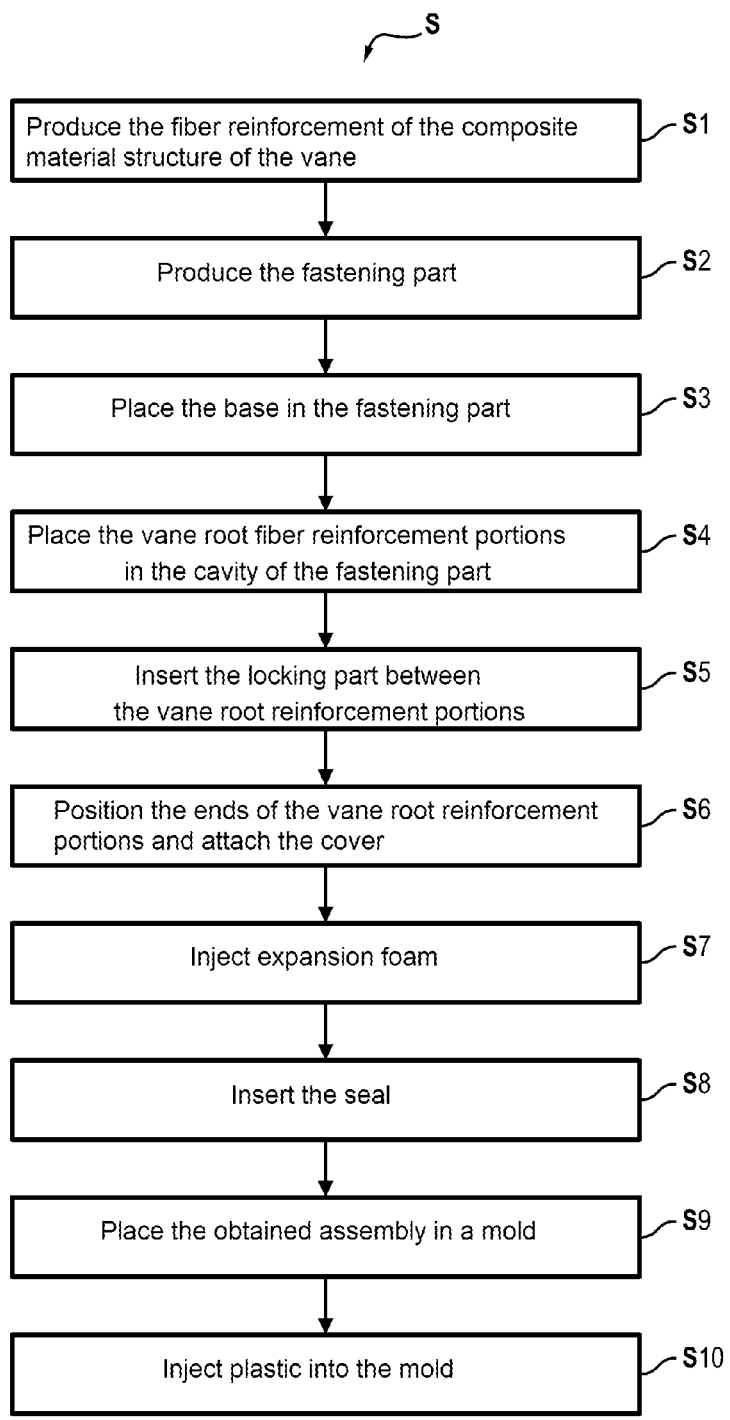

BLADE COMPRISING A COMPOSITE MATERIAL STRUCTURE AND ASSOCIATED MANUFACTURING METHOD

TECHNICAL FIELD

The application relates to a vane comprising a composite material structure.

The application more specifically, but not exclusively, relates to a vane intended to be used in an unducted rotor of an aircraft engine (such as an engine of Open Rotor type, the fan of which is unducted, having two rotating propellers or an engine of USF (Unducted Single Fan) type having a movable set of vanes and a fixed set of vanes or a turbo-propeller having an architecture with a single propeller) or in a wind turbine rotor.

BACKGROUND

The benefit of unducted fan engines is that the diameter of the fan is not limited by the presence of a fairing, such that it is possible to design an engine having a high bypass ratio, and consequently a reduced fuel consumption.

Thus, in this type of engine, the vanes of the fan can have a large span.

In addition, these engines generally comprise a mechanism used to modify the pitch angle of the vanes in order to adapt the thrust generated by the fan to the different flight phases.

However, the design of such vanes requires antagonistic stresses to be taken into account.

On the one hand, the dimensioning of these vanes must allow optimal aerodynamic performance (maximize efficiency and supply thrust while minimizing losses). The improvement of the aerodynamic performance of the fan tends to an increase in the bypass ratio (BPR), which manifests as an increase in the outer diameter, and therefore the span of these vanes.

On the other hand, it is also necessary to guarantee a resistance to the mechanical stresses that can be exerted on these vanes while also limiting their acoustic signature.

Moreover, on unducted fan turbomachine architectures, the starting of the engine is generally made with a very open pitch angle. Specifically, a very open pitch angle is used to consume power via the torque, which ensures machine safety while guaranteeing low fan ratings.

However, with a very open pitch angle, the vanes undergo a turbulent aerodynamic flow, completely detached, which generates a wideband vibrational excitation. In particular on vanes with wide chords and large spans, the bending force is intense, although the engine rating is not maximal.

Under normal operation, during the ground and flight phases, the pitch is varied (the pitch angle is narrower). The aerodynamic flow is therefore perfectly sound (reattached to the aerodynamic profile). The wideband stresses disappear, the rotation rating being higher, and the bending force is controlled.

Currently, these vanes are generally made of a metallic material. Although the metallic material vanes have a good mechanical resistance, they do have the drawback of having a relatively high mass.

In order to reduce this mass, it is desirable to be able to manufacture these vanes out of composite material. However, the intense aerodynamic forces to which these vanes would be submitted would risk damaging the vane and/or the hub in the interface area between these vanes and the hub of the fan rotor. This problem more particularly arises when the vanes are connected to the hub by way of pinned fasteners due to the vibration levels on the 1N, 2N and 3N engine orders.

PRESENTATION OF THE INVENTION

One aim of the disclosure is to propose a vane including a composite material, suitable for being used with a variable pitch mechanism and in an environment of Open Rotor type, while being capable of resisting intense aerodynamic forces, under the restrictions of a limited bulk and a minimal mass.

For this purpose provision is made, according to a first aspect of the disclosure, for a vane comprising:
  a composite material structure comprising a fiber reinforcement obtained by three-dimensional weaving and a matrix in which is embedded the fiber reinforcement, the composite material structure comprising a blade part with an aerodynamic profile and a vane root part, the vane root part comprising two portions each connected to the blade part,
  a vane root fastening part comprising a wall delineating a cavity and an opening formed in the wall, the composite material structure extending through the opening such that the blade part is located outside the fastening part and the vane root part is located inside the cavity, the vane root fastening part further comprising a shoulder, extending into the cavity from the wall
  a base disposed in the cavity, said base comprising a support configured to abut the shoulder of the vane root fastening part and a passage formed in the support, the portions of the vane root part of the composite material structure extending through the passage, and
  a locking part disposed in the cavity between the two portions of the vane root part, such that each portion of the vane root part is then pressed by the locking part against the support.

Certain preferred but non-limiting features of the vane according to the first aspect are as follows, taken individually or in combination:
  the vane further comprises an expansion foam disposed in the cavity between the base and the opening.
  an end of each of the portions of the vane root part is folded under the locking part or placed against a lower face of the base.
  the vane further comprises a cover applied against the ends of the portions of the vane root part and configured to be attached to the fastening part such as to lock said portions and the locking part.
  the fiber reinforcement comprises a blade fiber reinforcement portion and two vane root fiber reinforcement portions, and wherein the vane root fiber reinforcement portions are each woven continuously with the blade fiber reinforcement portion, the two vane root fiber reinforcement portions being separated by a untied area obtained during the three-dimensional weaving of the fiber reinforcement.
  flanks of the support delineating the passage are inclined such that the passage is divergent in the direction of a second opening of the fastening part, the second opening being located under the vane root part, on a side opposite the fastening part with respect to the opening.

According to a second aspect, the disclosure makes provision for a method for manufacturing a vane according to the first aspect described above on the basis of a fiber reinforcement obtained by three-dimensional weaving, the fiber reinforcement comprising a blade fiber reinforcement portion and two vane root fiber reinforcement portions, the method comprising steps of:

S2: producing the vane root fastening part such as to form the cavity and the shoulder, S3: placing the base in the fastening part against the shoulder, S4: placing the fiber reinforcement in the vane root fastening part through the opening such that the blade fiber reinforcement portion is located outside the fastening part and the two vane root fiber reinforcement portions are located inside the cavity, S5: inserting the locking part into the cavity between the two vane root reinforcement portions, such that each portion of the vane root part is then pressed by the locking part against the support, S9: placing the fiber reinforcement, the fastening part, the base and the locking part in a mold, S10: injecting plastic into the mold in such a way as to form the composite material structure comprising the fiber reinforcement and a matrix in which is embedded the fiber reinforcement.

Certain preferred but non-limiting features of the method according to the second aspect are as follows, taken individually or in combination:

the method further comprises, prior to the step S10 of injecting plastic, a step S7 of injecting an expansion foam into the cavity between the shoulder and the opening.

the method further comprises, after the step S5 of inserting the locking part, a step S6 of positioning an end of the vane root fiber reinforcement portions under the locking part or against a lower face of the base and of attaching a cover against said ends to retain the locking part bearing against the two vane root fiber reinforcement portions.

According to a third aspect, the disclosure makes provision for a gas turbine engine comprising a fan, the fan comprising a hub and vanes extending radially from the hub, the vanes being in accordance with the first aspect, each vane being mounted rotatably with respect to the hub about a respective pivoting axis, the engine further comprising an actuating mechanism suitable for being controlled to make the vanes rotate about their pivoting axis in such a way as to modify the pitch angle of the vanes.

According to a fourth aspect, the disclosure makes provision for an aircraft comprising a gas turbine according to the third aspect.

DESCRIPTION OF THE FIGURES

Other features, aims and advantages of the disclosure will become apparent from the following description, which is purely illustrative and non-limiting, and which must be read with reference to the appended drawings wherein:

FIG. 9 is a flow chart of steps of a method according to an embodiment of the invention.

In all the drawings, similar items bear identical reference numbers.

DETAILED DESCRIPTION

Figure 1:
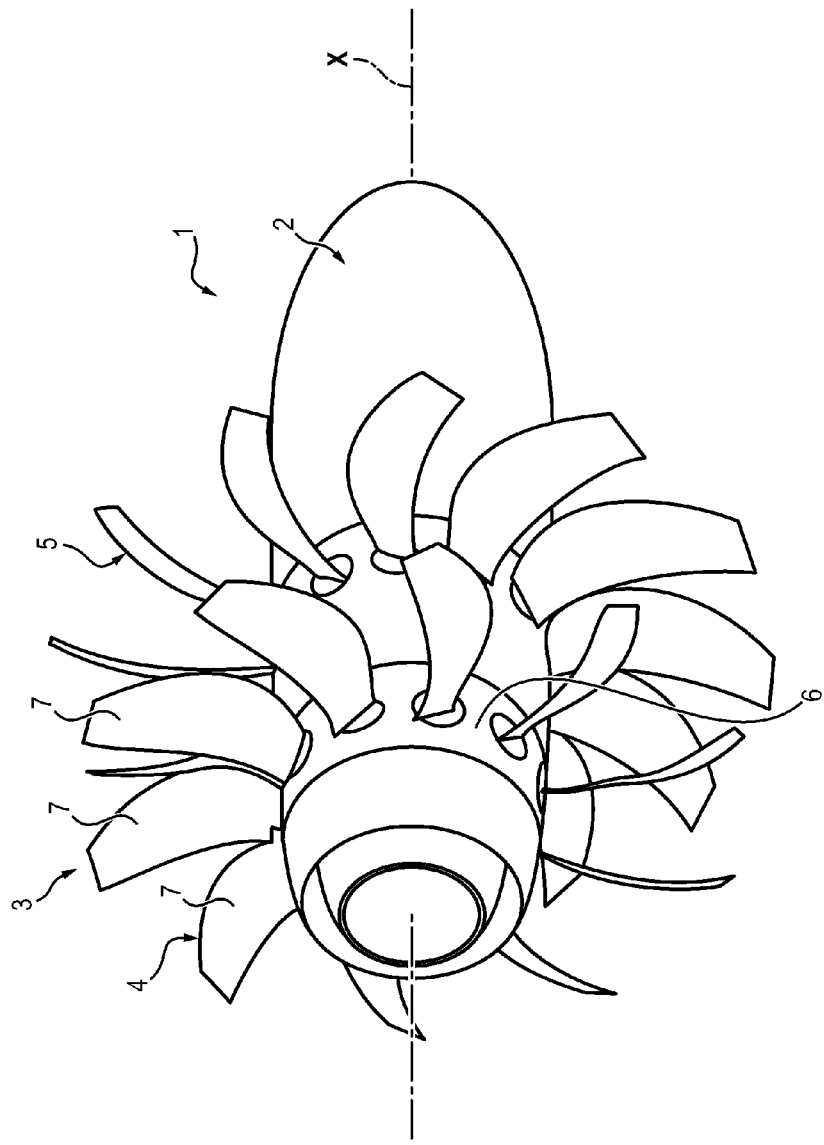
FIG. 1 schematically represents an example of an engine including an unducted fan, FIG. 2 schematically represents a fan vane and an actuating mechanism making it possible to modify the pitch angle of the fan vanes, FIG. 3A schematically represents a fan vane in accordance with a first embodiment of the invention, FIG. 3B schematically represents a fan vane in accordance with a second embodiment of the invention, FIG. 3C schematically represents a fan vane in accordance with a third embodiment of the invention, FIG. 4 schematically represents a composite material structure forming part of the vane, FIGS. 5 to 8 schematically illustrate steps of a method for manufacturing an exemplary embodiment of a fiber reinforcement for a vane in accordance with an embodiment of the invention.

In FIG. 1, the engine 1 represented is an engine of Open Rotor type, in the configuration currently referred to as the "pusher" configuration (i.e. the unducted fan is placed behind the power generator with an air inlet located on the side, to the right on FIG. 1).

The engine comprises a nacelle 2 intended to be attached to a fuselage of an aircraft, and an unducted fan 3. The fan 3 comprises two contra-rotating fan rotors 4 and 5. In other words, when the engine 1 is in operation, the rotors 4 and 5 are rotationally driven with respect to the nacelle 2 about one and the same axis of rotation X (which coincides with a main axis of the engine), in opposite directions.

In the example illustrated in FIG. 1, the engine 1 is an engine of Open Rotor type in the "pusher" configuration with contra-rotating fan rotors. However, the invention is not limited to this configuration. The invention is also applicable to engines of Open Rotor type in the "puller" configuration (i.e. the fan is placed upstream of the power generator with an air inlet located in front of, between or close behind the two fan rotors).

Furthermore, the invention also applies to engines having different architectures, such as an architecture comprising a fan rotor comprising movable vanes and a fan stator comprising fixed vanes, or else a single fan rotor.

The invention is applicable to architectures of turbopropeller type (comprising a single fan rotor).

In FIG. 1, each fan rotor 4, 5 comprises a hub 6 mounted rotatably with respect to the nacelle 2 and a plurality of vanes 7 attached to the hub 6. The vanes 7 extend substantially radially with respect to the axis of rotation of the hub.

Figure 2:
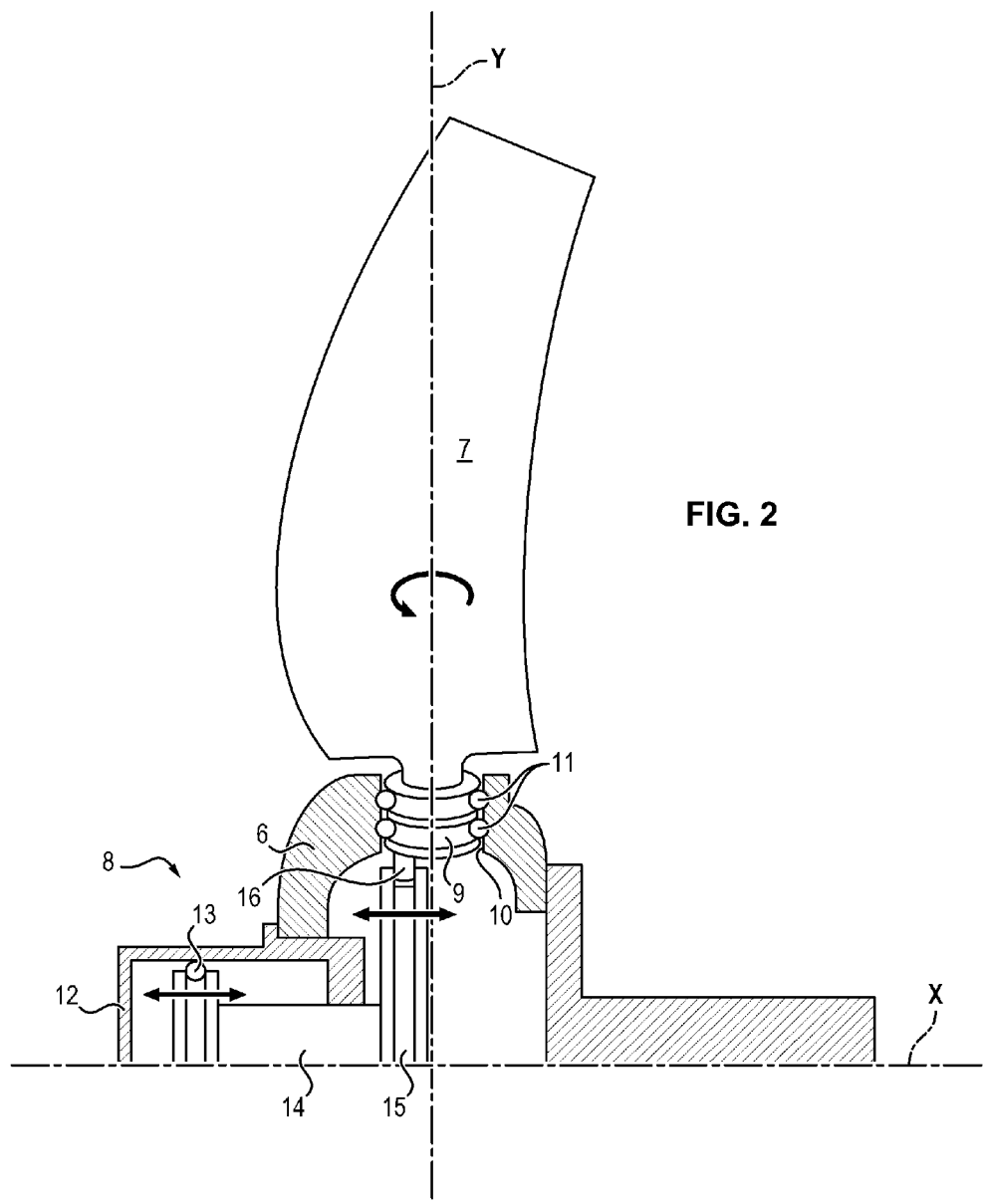

As illustrated in FIG. 2, the fan 3 further comprises an actuating mechanism 8 making it possible to collectively modify the pitch angle of the vanes of the rotors, in order to adapt the performance of the engine to the different phases of flight. For this purpose, each vane 7 comprises a fastening part 9 disposed at the vane root. The fastening part 9 is mounted rotatably with respect to the hub 6 about a pivoting axis Y. More precisely, the fastening part 9 is mounted rotatably inside a housing 10 fashioned in the hub 6, by way of balls 11 or other rolling elements.

The actuating mechanism 8 comprises an actuator 13 comprising a body 12 attached to the hub 6 and a rod 14 suitable for being translationally driven with respect to the body 12. The actuating mechanism 8 further comprises an annular slider 15 mounted securely to the rod 14 and a pin 16 mounted securely to the fastening part 9. The pin 16 is suitable for sliding in the slider 15 and being rotated with respect to the slider 15, in such a way as to convert a translational movement of the rod 14 into a rotational movement of the fastening part 9, and consequently a rotational movement of the vane 7 with respect to the hub 6 about its pivoting axis Y.

Figure 4:
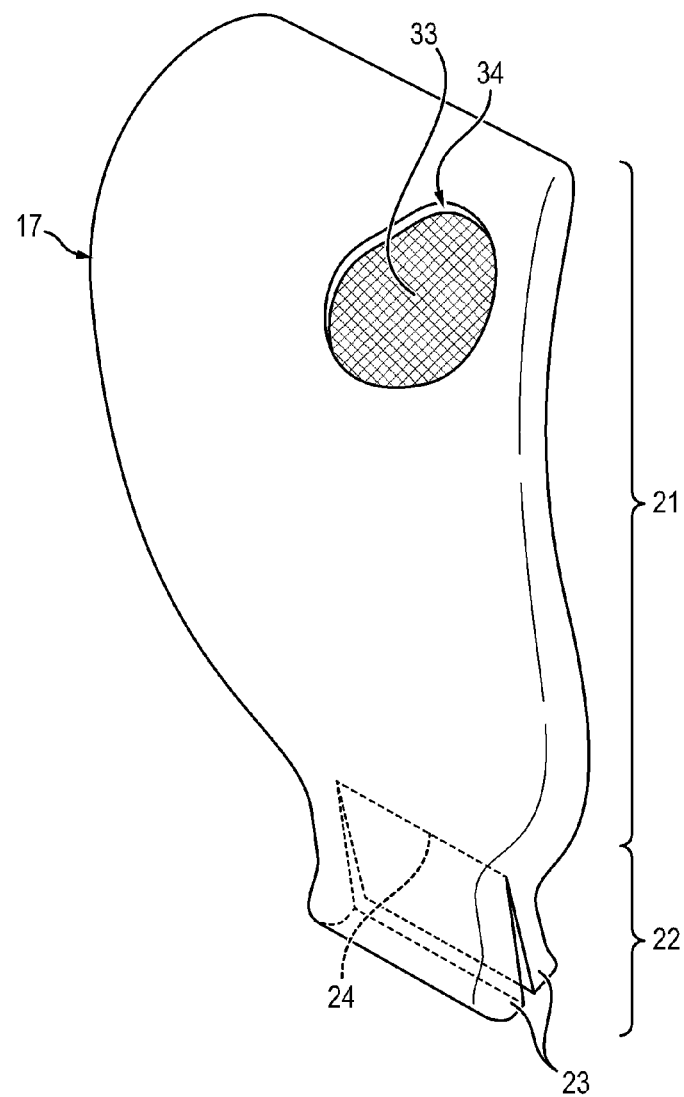
Figure 5:
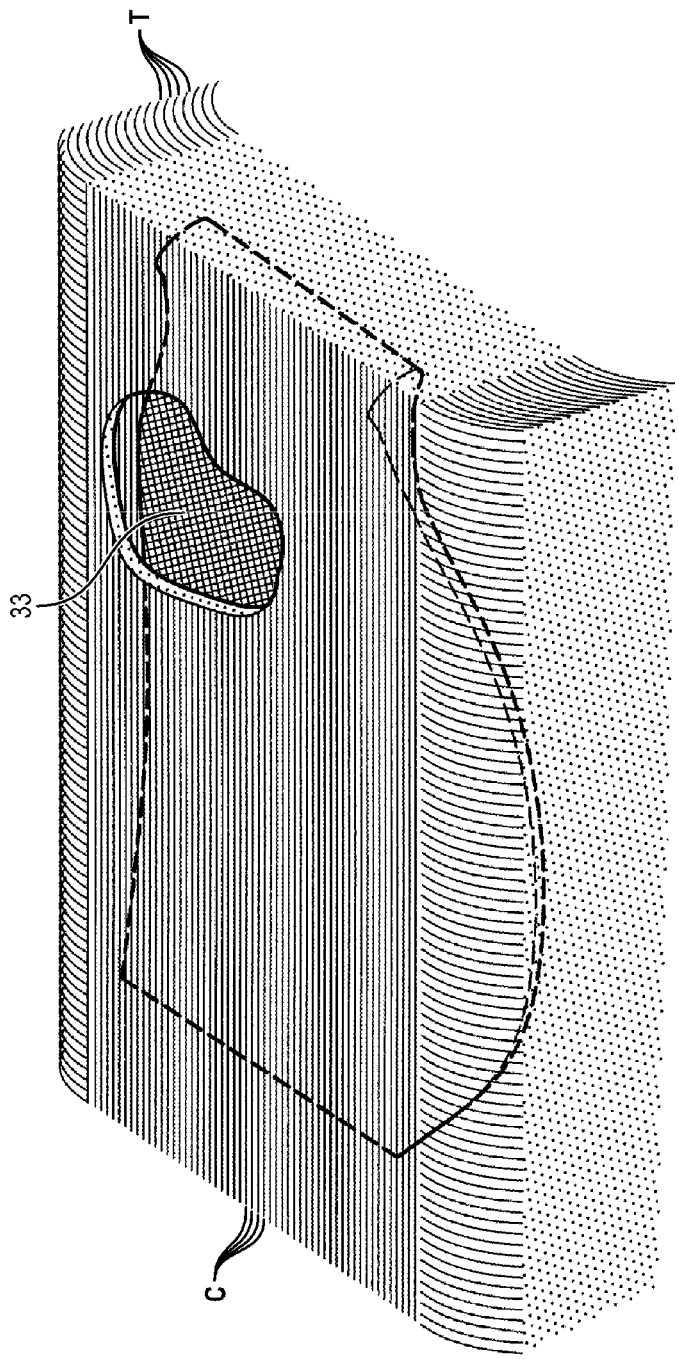

The fan vane 7 (FIG. 2) comprises a composite material structure 17 (FIG. 4), a fastening part of the root of the vane 7, a retaining base 18 and a locking part 19.

The composite material structure 17 comprising a fiber reinforcement 33 obtained by three-dimensional weaving and a matrix 34 in which is embedded the fiber reinforcement 33.

The fiber reinforcement can be formed on the basis of a fiber preform made of a single part obtained by three-dimensional weaving or multilayer weaving with variable thickness. It can in particular comprise fibers made of carbon, glass, aramid and/or ceramic. The matrix, meanwhile, is typically a polymer matrix, for example epoxy, bismaleimide or polyimide, or a carbon matrix. The vane 7 is then formed by molding by means of a vacuum resin injection process of RTM (Resin Transfer Molding) or VARTM (Vacuum Resin Transfer Molding) type.

The fiber reinforcement 33 is woven in such a way that it comprises warp threads which extend continuously both inside the blade part with an aerodynamic profile 21 and inside the vane root part 22.

The matrix 34 which coats the threads of the fiber reinforcement 33 is formed out of plastic, for example a resin of epoxy type.

The composite material structure 17 comprises a blade part 21 with an aerodynamic profile and a vane root part 22. The blade part 21 with an aerodynamic profile is suitable for being placed in an air stream, when the engine is in operation, in order to generate lift. The vane root part 22 is intended to allow the attachment of the composite material structure 17 to the fastening part 9.

The vane root part 22 comprises two portions 23 connected continuously to the blade part 21 at the level of a join area 24. In a embodiment, each portion 23 has a thickness which increases along the portion 23 in the direction away from the blade part 21 with an aerodynamic profile.

The fastening part 9 is formed out of metal, for example made of martensitic steel. The fastening part 9 comprises a wall having an outer surface having a revolution shape. The outer surface has two circular grooves 27 suitable for forming rolling tracks for balls or other rolling elements.

The wall of the fastening part 9 delineates a cavity configured to house the vane root part 22 of the composite material structure 17. The wall shows a first opening 29 in a general rectangular shape through which extends the composite material structure 17 such that the blade part 21 is located outside the fastening part 9. The fastening part 9 also has a second opening 30, wider than the first opening 29 and located under the vane root part 22, on a side opposite the fastening part 9 with respect to the first opening. Where applicable, this second opening 30 can be circular.

The fastening part 9 further comprises a shoulder 10 extending into the cavity from the wall. The shoulder 10 extends along the inner periphery of the wall, either continuously or discontinuously.

The retaining base 18 and the locking part 19 are also disposed inside the cavity.

The base 18 comprises a support configured to abut the shoulder 10 of the fastening part 9 and a passage 39 formed in a support suitable for receiving the portions 23 of the vane root part 22 of the composite material structure. In a embodiment, the base 18 is a bush, the outer periphery of which corresponds to the inner periphery of the fastening part 9, such that, when the bush is bearing against the shoulder 10, its outer periphery is in contact with the inner periphery of the vane root fastening part 9.

The base 18 is made out of metal, for example made of martensitic steel, aluminum or titanium.

The locking part 19 is placed between the two portions 23 of the vane root part 22 such as to retain the two portions 23 of the vane root part 22 separated from one another. The locking part 19 is abutting the join area 24 of the vane root part 22 such that each portion 23 of the vane root part 22 is then pressed by the locking part 19 against the support.

Thus, when the vane root part 22 is placed in the vane fastening part 9, the portions 23 are tightened between the flanks of the support and the locking part 19. The two portions 23 of the vane root part 22 are therefore separated from one another by the locking part 19 and pressed against the flanks to oppose a withdrawal of the vane root part 22 of the cavity via the opening 29.

In order to reinforce the tightening, the flanks of the support delineating the passage 39 can be inclined, i.e. the passage 39 diverges from the upper face 38*a* of the support (which corresponds to the face 38*a* of the support suitable for abutting the shoulder 10) in the direction of the lower face 38*b* (which is opposite the upper face 38*a*). The flanks can be substantially flat.

Advantageously, the locking of the portions 23 of the vane root part 22 with the use of a base 18 and a locking part 19 makes it possible to benefit from the advantages of a fastening of dagger type (radial mounting in the hub) while maintaining the take-up of the centrifugal forces via the specific bearing surfaces (the flanks of the support) of a pinned fastener.

Where applicable, the join between the lower face 38*b* and the flank can be beveled or dulled to avoid any damage to the composite material structure 17.

Figure 3C:
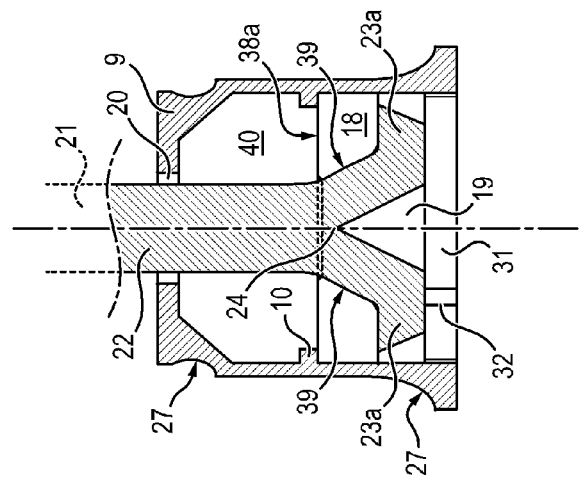
Figure 3B:
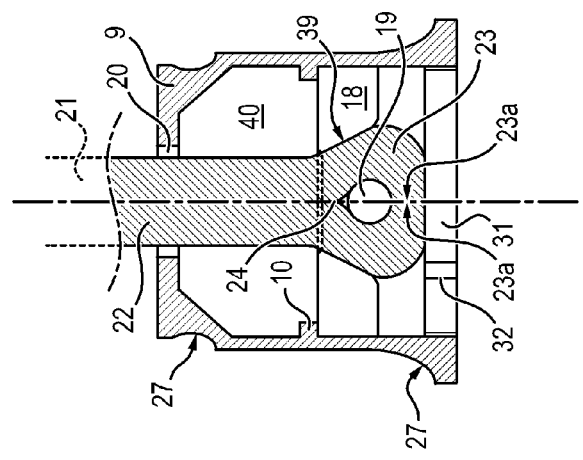
Figure 3A:
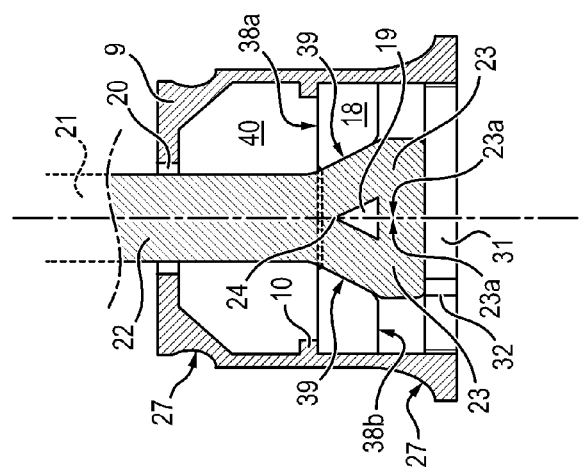

The locking part can have any shape suitable for allowing the tightening of the portions 23 against the flanks of the support. For example, as illustrated in FIGS. 3A and 3C, the locking part can have a prismatic shape, the apex angles of which are such that the faces of the prism are substantially parallel to the flanks when the locking part 19 is placed in the fastening part 9. In a variant, as illustrated in FIG. 3B, the locking part can have a substantially cylindrical revolution shape.

The fan vane 7 further comprises a cover 31 suitable for being attached to the fastening part 9 such as to exert on the locking part 19 a force tending to press the locking part 19 against the vane root portions 23 and to press them against the support. When the cover 31 is attached to the fastening part 9, it shuts off the second opening 30. Thus, when the second opening is circular, the cover can in particular be attached by screwing to the fastening part 9.

At least one through hole 32 is also formed in the cover to allow the injection of the matrix to coat the fiber reinforcement of the composite material structure 17.

The cover 31 is preferably made of metal, for example martensitic steel, aluminum or titanium.

In a first embodiment, the end 23*a* of each of the portions 23 of the vane root part 22 is folded under the locking part 19. The locking part 19 is therefore housed in the portions 23 and does not come into direct contact with the cover 31. The attachment of the cover 31 to the fastening part 9 therefore has the effect of compressing the end 23*a* of the portions 23 against the locking part 19.

In a second embodiment, the end 23*a* of each of the portions 23 of the vane root part 22 is folded outwards such as to extend under the lower face 38*b* of the support, in the direction of the wall of the fastening part 9. The locking part 19 then comes into contact with the cover 31 while the portions 23 are clamped between the cover 31 and the support of the base 18.

Whatever the embodiment, the portions 23 of the vane root part 22 are locked in position by the cover 31. No movement is therefore possible for the portions 23 in the fastening part 9 owing on the one hand to their locking by the cover 31 and on the other hand to their pressing against the support of the base 18 by the locking part 19.

An expansion foam 40 is moreover injected into the cavity of the fastening part 9 between the first opening 29 and the base 18 in order to ensure the positioning of the composite material structure 17 during the injection process and to take up the transverse forces applied to the vane 7. The foam 40 thus makes it possible to fill the upper part of the cavity and to stiffen the vane root part 22 which extends from the join area 24 in the direction of the blade part 21 with an aerodynamic profile, without it having too much impact on the mass of the vane 7. In particular, the injection of the expansion foam 40 participates in preventing any movement of the vane root part 22 in the fastening part 9, thus suppressing friction and hence the premature damage by vibrational fatigue that is habitually observed in Open Rotors on pinned fasteners.

The foam 40 can in particular belong to at least one of the following families: polyurethane foam, phenolic foam, polystyrene foam.

The vane 7 further comprises a seal 20 placed in the first opening 29, between the composite material structure 17 and the edge of the first opening 29 surrounding the composite material structure 17. The seal 20 makes it possible to fill the clearance remaining between the composite material structure 17 and the fastening part 9.

The seal can in particular comprise an elastomer, for example an RTV (Room Temperature Vulcanizing) silicon elastomer.

FIGS. 5 to 9 illustrate steps of a method S for manufacturing a fan vane 7 in accordance with a possible embodiment of the invention.

According to a first step S1 (FIG. 5), the fiber reinforcement 33 is produced by three-dimensional weaving on a Jacquard-type loom. During the weaving, bundles of warp threads C (or warp strands) are disposed in several layers of several hundreds of threads each. Weft threads (T) (or weft strands) are interlaced with the warp threads C in such a way as to link the different layers of warp threads C to one another.

In the illustrated example, the three-dimensional weaving is an "interlock" weave. The term "interlock" denotes a weave in which each layer of weft threads links several layers of warp threads with all the threads of one and the same weft column having the same movement in the weave plane.

Other known types of three-dimensional weaving can be used, in particular those described in the document WO 2006/136755.

Figure 6:
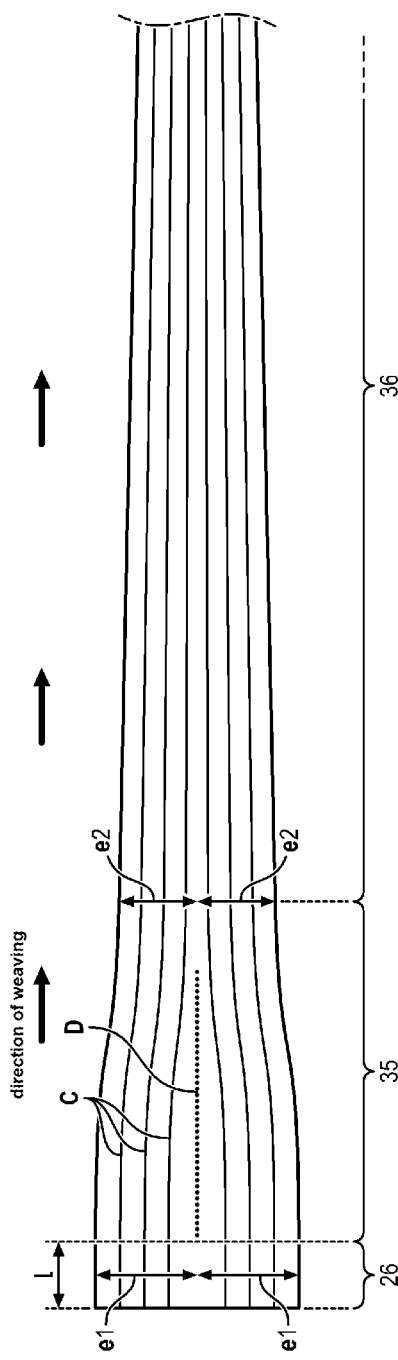

As illustrated in FIG. 6, the step of weaving the raw (or preform) fiber reinforcement 33 successively comprises the weaving of a provisional fiber reinforcement portion 26 (which will be discarded later on in the manufacturing process), the weaving of the two vane root fiber reinforcement portions 35 intended to form the portions 23, then the weaving of a blade fiber reinforcement portion 36 intended to form the rest of the vane root 22.

The provisional fiber reinforcement portion 26 is woven by interweaving all the warp strands C needed to produce the fiber reinforcement 33. Once the weft column has reached a predetermined width I, a disconnect D is initiated between two successive layers of warp threads C. Next, the two vane root fiber reinforcement portions 35 are woven parallel to one another, while being separated by the untied area D. Next, the disconnect D is stopped at the level of the join area 24 and the blade fiber reinforcement portion 36 is woven.

In this way, each of the two vane root reinforcement portions 35 comprises warp threads C which extend inside the blade fiber reinforcement portion 36.

Figure 7A:
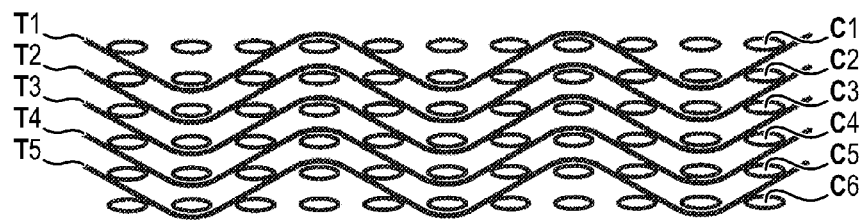

FIG. 7A is a magnified schematic view in cross-section of a plurality of layers of warp threads C1 to C6, in a part of the fiber reinforcement not comprising any disconnect. In this example, the fiber reinforcement comprises six layers of warp threads C1 to C6 extending along a direction transverse to the section plane. The layers of warp threads C1 to C6 are interlinked by five layers of weft threads T1 to T5 extending into the section plane (or weave plane).

Figure 7B:
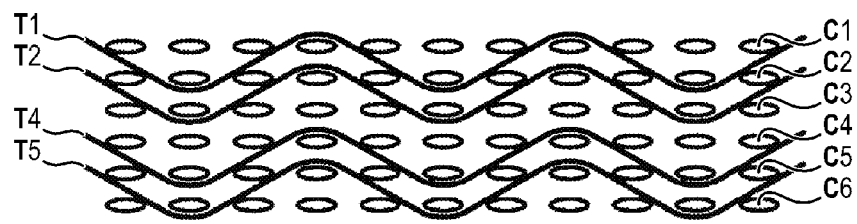

FIG. 7B is a magnified schematic view in cross-section of a plurality of layers of warp threads C1 to C6, in a part of the fiber reinforcement including a disconnect. The three layers of warp threads C1 to C3 are interlinked by two layers of weft threads T1 and T2, while the three layers of warp threads C4 to C6 are interlinked by two layers of weft threads T4 and T5. As can be seen in FIG. 7B, two adjacent layers of warp threads C3 and C4 are not interlinked by weft threads, such that a disconnect is formed in the fiber reinforcement.

In an embodiment, as can be seen in FIG. 6, each vane root fiber reinforcement portion 35 can be woven with successive weft strands T which have different titers, which decrease in the direction of weaving (direction of weaving indicated by the arrow), i.e. titers which decrease the closer they are to the blade fiber reinforcement portion 36.

It should be recalled that the "titer" denotes a quantity characterizing the fineness of a thread: it is defined as the mass of the thread per unit length. The standard unit of measurement of the titer is the Tex (mass in grams of 1000 meters of thread) or the Decitex (mass in grams of 10000 meters of thread). Other units can also be used such as the denier, the Number Metric or the Number English.

In this way, the vane root fiber reinforcement portions 35 each have a thickness e which decreases the closer it gets to the blade fiber reinforcement portion 36. Each vane root fiber reinforcement portion has a thickness e1 at the vane root, and a thickness e2 at the join with the blade fiber reinforcement portion 36, less than e1.

This embodiment is however not limiting, since the vane root fiber reinforcement portions 35 can be of constant thickness.

As the fiber reinforcement 33 of variable thickness and width is woven, a certain number of warp threads C are not woven, which makes it possible to define a desired continuously variable contour, width and thickness of the fiber reinforcement 33.

Figure 8:
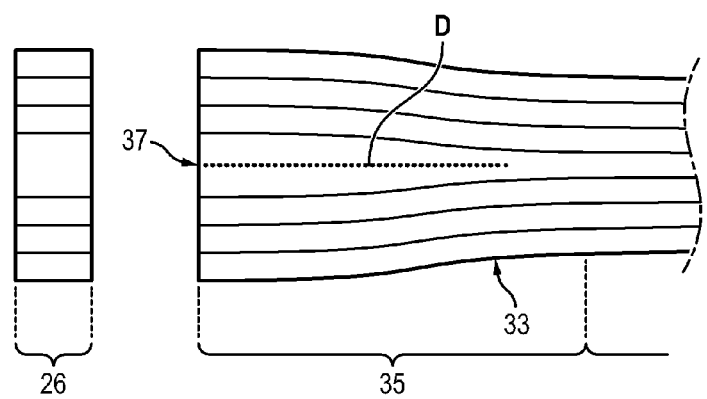

The warp threads C and the weft threads T located at the limit of the woven mass (or "floated") are also cut, in such a way as to extract the fiber reinforcement 33 (FIG. 8).

Next, the finished fiber reinforcement is obtained by contouring the preform. Contouring refers to the cutting of the preform, laid flat, along the leading edge and the trailing edge of the head (leaving overlengths on these three cutouts). Contouring is also done along the lower air path and on the lateral faces of the vane root part.

Furthermore, the provisional fiber reinforcement portion 26 is cut in order to be removed, such that the disconnect D forms an opening 37 which opens between the two vane root reinforcement portions 35. The contouring and the cutting of the vane root portion can be done by pressurized water jet.

According to a second step S2, the fastening part 9 is produced, for example by machining, to form the cavity, the first opening 29, the second opening 30, the shoulder 10 and where applicable a threading at the level of the second opening 30 to allow the cover 31 to be screwed on.

According to a third step S3, the base 18 is inserted into the fastening part 9 via the second opening 30 and placed abutting the shoulder 10.

According to a fourth step S4, the vane root fiber reinforcement portions 35 are inserted into the cavity of the fastening part 9 through the passage 39 of the base 18 via the first opening 29 of the fastening part 9. Once the vane root fiber reinforcement portions 35 have been inserted into the cavity, they extend inside the cavity of the fastening part 9 while passing through the passage 39 of the base 18 while the blade fiber reinforcement portion 36 extends outside the fastening part 9.

According to a fifth step S5, the locking part 19 is inserted through the second opening 30 between the two vane root fiber reinforcement portions 35 such as to separate the two portions 35 from one another.

According to a sixth step S6, the ends of the vane root reinforcement portions 35 are placed either against the lower face 38b of the support, or under the locking part 19, then the cover part 31 is attached to the fastening part 9 such as to lock the two vane root reinforcement portions 35 and to keep the locking part 19 bearing against said portions. In particular, the cover 31 is attached in such a way that it exerts on the vane root reinforcement portions 35 a compression force tending to drive in the locking part 19 between the two portions toward the blade part 21 with an aerodynamic profile and to press them against the flanks of the support. This mounting makes it possible to guarantee that the two vane root reinforcement portions 35 remain separated from one another in order to resist, by geometric effect, the centrifugal forces exerted on the vane 7 during the operation of the engine.

According to a seventh step S7, the expansion foam 40 is injected such as to fill the cavity of the upper face 38a of the support all the way to the first opening 29, then densified by polymerization.

Note that, in a variant embodiment, this step of injecting and densifying the expansion foam 40 can also be done prior to the step of inserting the base 18. In the case, during the second step S2, the fastening part 9 is pre-machined such as to produce a depression, the contours of which correspond overall to the portion of the cavity which extends between the shoulder 10 and the first opening 29. The expansion foam 40 is then injected into this depression and densified, then the fastening part 9 and the expansion foam 40 are machined such as to obtain the rest of the cavity, the first opening 29, the second opening 30, the shoulder 10 and where applicable the threading at the level of the second opening 30 to allow the cover 31 to be screwed on. The rest of the steps S3 to S6 are then unchanged.

According to an eighth step S8, the seal 20 is inserted into the first opening 29.

According to a ninth step S9 (FIG. 9), the assembly obtained, comprising the fiber reinforcement 33, the fastening part 9, the expansion foam 40, the base 18, the locking part 19, the seal 20 and the cover 31, is placed in a mold (not shown) having a cavity in the shape of the molded final part (namely the fan vane 7).

According to a tenth step S10, plastic (called the "matrix") is injected into the mold via the hole or holes 32 formed in the cover 31 in such a way as to impregnate the entire fiber reinforcement 33. The injection of plastic can be effected by an injection technique of RTM or VARTM type. The plastic injected is for example a thermosetting liquid composition containing an organic precursor of the material of the matrix. The organic precursor habitually takes the a polymer, such as a resin, where applicable diluted in a solvent.

In a manner known per se, the plastic is heated in such a way as to cause the polymerization of the plastic, for example by cross-linking. For this purpose, the mold is placed in a furnace. The obtained part is then demolded and contoured by machining the leading edge, the trailing edge and the blade head in order to obtain a part with the desired shape. The lower part of the vane is also machined.

The reinforcement 33 impregnated with plastic composing the matrix 34 forms the composite material structure 17 of the vane 7.

The invention claimed is:

1. A vane comprising:
 a composite material structure comprising a fiber reinforcement obtained by three-dimensional weaving and a matrix in which the fiber reinforcement is embedded, the composite material structure comprising a blade part with an aerodynamic profile and a vane root part, the vane root part comprising two portions each connected to the blade part;
 a vane root fastening part comprising a wall defining a cavity and an opening formed in the wall, the composite material structure extending through the opening such that the blade part is located outside the fastening part and the vane root part is located within the cavity, the vane root fastening part further comprising a shoulder extending from the wall into the cavity;
 a base disposed in the cavity, the base comprising a support configured to abut the shoulder of the vane root fastening part and a passage formed in the support, the two portions of the vane root part of the composite material structure extending through the passage; and
 a locking part disposed in the cavity between the two portions of the vane root part, such that each portion of the vane root part is pressed by the locking part against the support; and
 an expansion foam disposed in the cavity between the base and the opening.

2. The vane as claimed in claim 1, wherein an end of each of the two portions of the vane root part is folded under the locking part or placed against a lower face of the base, the lower face of the base being opposite an upper face where the upper face corresponds to a face of the support that abuts the shoulder.

3. The vane as claimed in claim 2, further comprising a cover applied against the ends of the portions of the vane root part and configured to be attached to the fastening part so as to lock the two portions of the vane root part and the locking part.

4. The vane as claimed in claim 1, wherein the fiber reinforcement comprises a blade fiber reinforcement portion and two vane root fiber reinforcement portions, and wherein the vane root fiber reinforcement portions are each continuously woven with the blade fiber reinforcement portion, the two vane root fiber reinforcement portions being separated by a untied area obtained during the three-dimensional weaving of the fiber reinforcement.

5. The vane as claimed in claim 1, wherein the flanks of the support delimiting the passage are inclined such that the passage diverges towards a second opening of the fastening part, the second opening being located on a side opposite the fastening part with respect to the opening.

6. A method for manufacturing a vane comprising steps of:
producing a vane root fastening part comprising a wall defining a cavity and an opening formed in the wall and a shoulder extending from the wall into the cavity;
placing a base in the vane root fastening part against the shoulder;
placing a fiber reinforcement obtained by three-dimensional weaving and a matrix in which the fiber reinforcement is embedded in the vane root fastening part through the opening such that a blade part of the fiber reinforcement is located outside the fastening part and a vane root part of the fiber reinforcement is located inside the cavity, wherein the vane root part comprises two portions connected to the blade part;
inserting a locking part into the cavity between the two portions of the vane root part, such that each portion of the vane root part is pressed by the locking part against a support;
placing the fiber reinforcement, the fastening part, the base and the locking part in a mold;
injecting plastic into the mold in such a way as to form a composite material structure comprising the fiber reinforcement and the matrix in which the fiber reinforcement is embedded.

7. The method as claimed in claim 6, further comprising, prior to the injecting step, a step of injecting an expansion foam into the cavity between the shoulder and the opening.

8. The method as claimed in claim 6, further comprising, after the inserting step, a step of positioning an end of the two portions of the vane root part between the locking part and a cover or against a lower face of the base, the lower face of the base being opposite an upper face where the upper face corresponds to a face of the support that abuts the shoulder and a step of attaching the cover against said ends to keep the locking part bearing against the two portions of the vane part.

9. A gas turbine engine comprising a fan, the fan comprising a hub and vanes extending radially from the hub, each vane comprising:
a composite material structure comprising a fiber reinforcement obtained by three-dimensional weaving and a matrix in which the fiber reinforcement is embedded, the composite material structure comprising a blade part with an aerodynamic profile and a vane root part, the vane root part comprising two portions each connected to the blade part;
a vane root fastening part comprising a wall defining a cavity and an opening formed in the wall, the composite material structure extending through the opening such that the blade part is located outside the fastening part and the vane root part is located within the cavity, the vane root fastening part further comprising a shoulder extending from the wall into the cavity;
a base disposed in the cavity, the base comprising a support configured to abut the shoulder of the vane root fastening part and a passage formed in the support, the two portions of the vane root part of the composite material structure extending through the passage; and
a locking part disposed in the cavity between the two portions of the vane root part, such that each portion of the vane root part is pressed by the locking part against the support;
wherein each vane is mounted rotatably with respect to the hub about a respective pivoting axis, the engine further comprising an actuating mechanism configured to make the vanes rotate about their respective pivoting axis in such a way as to modify a pitch angle of the vanes.

10. An aircraft comprising a fuselage and a gas turbine comprising a fan, the gas turbine engine being attached to the fuselage, the fan comprising a hub and vanes extending radially from the hub,
each vane comprising:
a composite material structure comprising a fiber reinforcement obtained by three-dimensional weaving and a matrix in which the fiber reinforcement is embedded, the composite material structure comprising a blade part with an aerodynamic profile and a vane root part, the vane root part comprising two portions each connected to the blade part;
a vane root fastening part comprising a wall defining a cavity and an opening formed in the wall, the composite material structure extending through the opening such that the blade part is located outside the fastening part and the vane root part is located within the cavity, the vane root fastening part further comprising a shoulder extending from the wall into the cavity;
a base disposed in the cavity, the base comprising a support configured to abut the shoulder of the vane root fastening part and a passage formed in the support, the two portions of the vane root part of the composite material structure extending through the passage; and
a locking part disposed in the cavity between the two portions of the vane root part, such that each portion of the vane root part is pressed by the locking part against the support;
wherein each vane is mounted rotatably with respect to the hub about a respective pivoting axis, the engine further comprising an actuating mechanism configured to make the vanes rotate about their respective pivoting axis in such a way as to modify a pitch angle of the vanes.

* * * * *